United States Patent [19]

Senkyrik

[11] 3,855,831
[45] Dec. 24, 1974

[54] WHEEL STRAIGHTENER
[75] Inventor: Frank Senkyrik, Seagonville, Tex.
[73] Assignee: The Raymond Lee Organization, Inc., New York, N.Y.
[22] Filed: Mar. 16, 1973
[21] Appl. No.: 342,296

[52] U.S. Cl. .................................................. 72/32
[51] Int. Cl. ........................................... B21c 51/00
[58] Field of Search ......... 72/10, 34, 296, 297, 298, 72/31, 32, 705; 29/159.1, 159.01; 113/116 D

[56] References Cited
UNITED STATES PATENTS

| | | | |
|---|---|---|---|
| 852,829 | 5/1907 | Einfeldt | 72/34 |
| 1,555,972 | 10/1925 | Hervig | 72/389 |
| 2,767,764 | 10/1956 | Smith | 72/34 |
| 3,566,640 | 3/1971 | Harrington | 72/10 |

Primary Examiner—C. W. Lanham
Assistant Examiner—M. J. Keenan
Attorney, Agent, or Firm—Howard I. Podell

[57] ABSTRACT

Apparatus for straightening the wheels of automobiles, consisting of a central mount which fastens through the holes of the wheel hub, the central mount being rotatable and supported in bearing, tension and compression. A gauge is mounted so as to ride on the wheel rim as the wheel is rotated on the central mount, said gauge indicating out-of-plane deflection of the wheel rim. A hydraulic jack is located so as to bear against one section of the wheel rim, with means to control said jack so as to force the wheel rim into its proper plane, as indicated by the gauge located directly above the jack.

2 Claims, 2 Drawing Figures

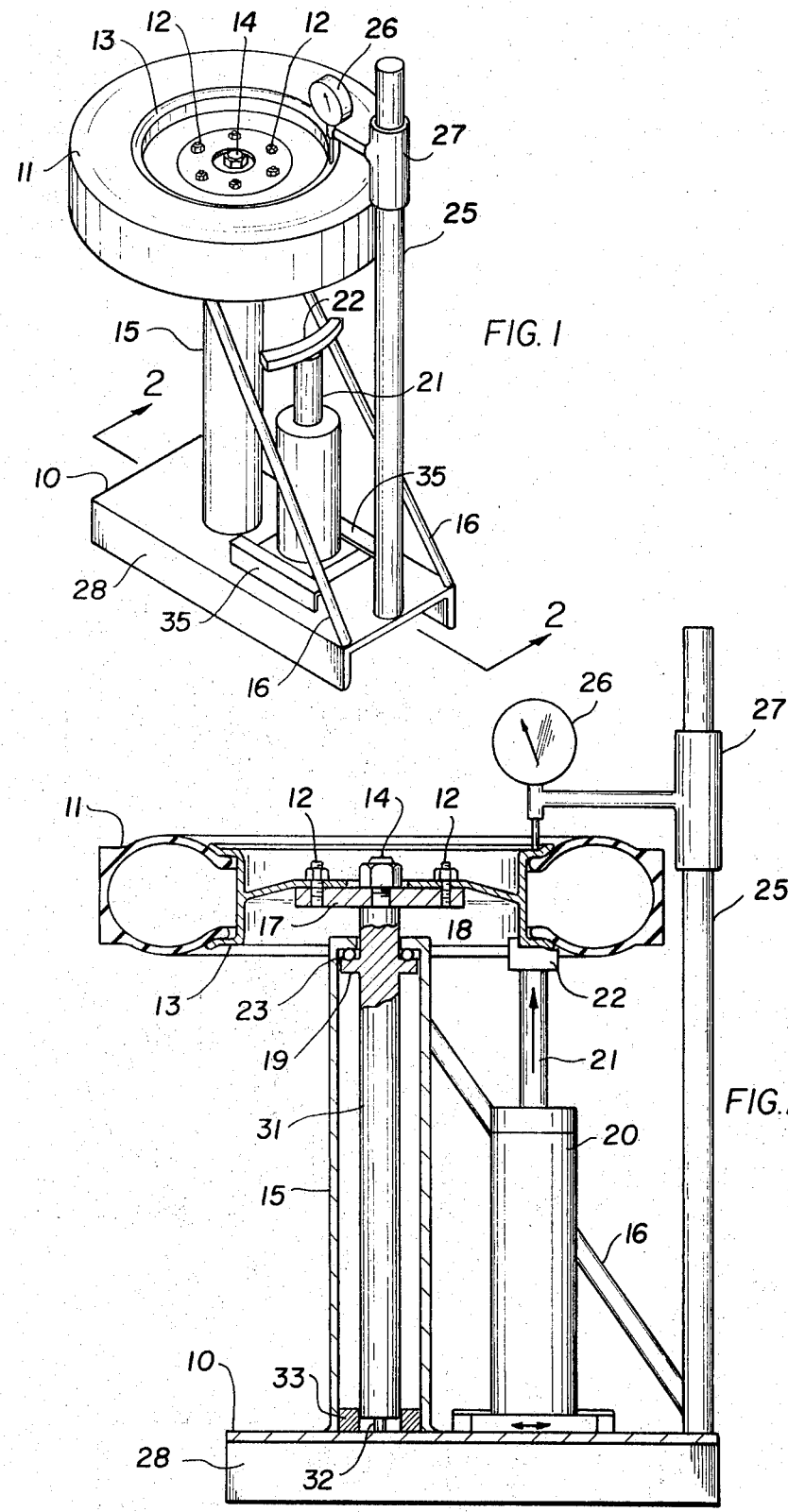

WHEEL STRAIGHTENER

SUMMARY OF THE INVENTION

This invention relates to an apparatus for straightening automobile wheels which are out-of-plane.

The apparatus consists of a rotatable center mount, to which the wheel is fastened through holes in its hub, with a deflection gauge and a hydraulic jack located opposite a section of the rim of the wheel.

Rotating the wheel on the mount causes the gauge to register out-of-plane deflections. The hydraulic jack may then be forced against the rim to bend the wheel back into plane, as indicated by the instrument.

BRIEF DESCRIPTION OF THE DRAWING

The objects and features of the invention may be understood with reference to the following detailed description of an illustrative embodiment of the invention taken together with the accompanying drawing in which:

FIG. 1 is a perspective view of the apparatus; and

FIG. 2 is an elevation in cross section of the apparatus along line 2—2 of FIG. 1.

DESCRIPTION OF THE PREFERRED EMBODIMENT

Turning now descriptively to the drawing, in which similar reference characters denote similar elements throughout the several views, FIG. 1 illustrates an automobile wheel 11 mounted on the apparatus 10 by bolts 12 through the normal mounting holes of the wheel hub.

A deflection gauge 26 is mounted on vertical cylindrical support 25 by adjustable rotatable collar 27. Collar 27 is clamped in place so as to locate the gauge 26 directly above the section of the wheel rim 13 that is above compression fitting 22 of hydraulic jack 20.

As shown in FIG. 2, the central column 15 supporting the wheel 11 includes a rotatable column 31 which rides on pivot 32 resting on base 28. The rotatable column 31 is supported in bearing, tension and compression by bearings 23, flange 19 of the column, and supporting ring 33, so as to balance the upward forces of the ram 21 of hydraulic jack 20 bearing against the wheel rim 13.

Diagonal struts 16 give rigidity to the central column 15. Hydraulic jack 20 is free to slide in mounting flanges 35 fastened to base 28 so that it may bear directly against the rim 13 of the wheel 11.

Since obvious changes may be made in the specific embodiment of the invention described herein without departing from the scope thereof, it is indicated that all matter contained herein is intended to be interpreted in an illustrative and not in a limiting sense.

Having thus described my invention, what I claim as new and desire to secure by Letters Patent of the United States is:

1. Apparatus for straightening the wheels of an automobile, consisting of a central mount, fastened to a base, upon which an automobile wheel may be fastened through holes in its hub, said central mount being rotatable with respect to said base, with a gauge supported from the base independently of the central mount and located adjacent to a section of the rim of said automobile wheel in the fastened position, said gauge measuring the variation of deflection from a plane of the automobile rim as said fastened automobile rim and wheel is rotated, together with
   a hydraulic jack mounted to the base and located to bear against the automobile rim directly opposite the gauge such that the gauge will measure the deflection of the stressed wheel rim as the hydraulic jack bears upwardly against the wheel rim in restoring the wheel to a plane condition.

2. The combination recited in claim 1 in which the gauge may be adjusted for distance away from the wheel rim, and location, by means of a rotatable collar which clamps in position on a vertical cylindrical member fastened to the base member.

* * * * *